United States Patent
Sharma et al.

(10) Patent No.: US 9,026,076 B2
(45) Date of Patent: May 5, 2015

(54) CONTROL OF TIME LIMIT TRIGGERS FOR OFFLINE CHARGING

(71) Applicants: Ranjan Sharma, New Albany, OH (US); Yigang Cai, Naperville, IL (US)

(72) Inventors: Ranjan Sharma, New Albany, OH (US); Yigang Cai, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 133 days.

(21) Appl. No.: 13/840,731

(22) Filed: Mar. 15, 2013

(65) Prior Publication Data

US 2014/0273933 A1  Sep. 18, 2014

(51) Int. Cl.
*H04M 11/00* (2006.01)
*H04M 15/00* (2006.01)
*H04W 4/24* (2009.01)

(52) U.S. Cl.
CPC ............... *H04M 15/65* (2013.01); *H04W 4/24* (2013.01); *H04M 15/41* (2013.01); *H04M 15/43* (2013.01); *H04M 15/44* (2013.01)

(58) Field of Classification Search
CPC ....... H04W 4/005; H04W 4/008; H04W 4/02; H04W 4/12; H04W 4/20; H04W 4/24; H04W 8/005; H04W 4/26
USPC .............. 455/405, 406, 407, 411, 414.1, 417, 455/445, 461, 556.1, 556.2, 557
See application file for complete search history.

(56) References Cited

U.S. PATENT DOCUMENTS

| 7,424,102 | B2 * | 9/2008 | Koskinen et al. ........ 379/114.22 |
| 7,471,634 | B1 * | 12/2008 | Wenzel et al. ................ 370/241 |
| 2008/0147524 | A1 * | 6/2008 | Connelly ......................... 705/30 |
| 2010/0257077 | A1 | 10/2010 | Cai et al. |
| 2011/0275345 | A1 * | 11/2011 | Cai et al. ...................... 455/406 |

OTHER PUBLICATIONS

3GPP TS 32.251 V1.0.0 (Sep. 2003), 3rd Generation Partnership Project; Technical Specification Group Services and System Aspects; Telecommunication management; Charging management; Packet Switched (PS) domain charging (Release 6)650 Route des Lucioles—Sophia Antipolis Valbonne—France.

* cited by examiner

*Primary Examiner* — Jean Gelin
(74) *Attorney, Agent, or Firm* — Duft, Bornsen & Fettig, LLP

(57) ABSTRACT

Systems and methods for controlling time limit triggers for offline charging. In one embodiment, a network element that serves an active session for User Equipment (UE) includes a Charging Trigger Function (CTF) that detect expiry of a time limit for triggering an interim accounting request to an offline charging system during the active session. The CTF then identifies a data usage by the UE during the time limit, and determines if the data usage by the UE during the time limit exceeds a threshold. If the data usage exceeds the threshold, then the CTF sends the interim accounting request to the offline charging system responsive to expiry of the time limit. If the data usage does not exceed the threshold, then the CTF stops the interim accounting request from being sent to the offline charging system responsive to expiry of the time limit.

20 Claims, 4 Drawing Sheets

CONTROL OF TIME LIMIT TRIGGERS FOR OFFLINE CHARGING

FIELD OF THE INVENTION

The invention is related to the field of communications and, in particular, to offline charging in communication networks.

BACKGROUND

Service providers are able to provide numerous voice and data services to end users (also referred to as subscribers, user equipment, wireless devices, etc.). Examples of voice services are voice calls, call forwarding, call waiting, etc. Examples of data services are streaming audio, streaming video, Voice over Internet Protocol (VoIP), online gaming, IP-TV, etc. The data services are managed by a Packet-Switched (PS) core network, which interfaces the end user with one or more external Packet Data Networks (PDN), such as the Internet. When accessing data services, the sessions established by end users are typically much longer in duration than traditional voice calls. For instance, a typical voice call may last ten minutes or less, while data sessions for surfing the Internet, watching IP-TV, playing online games, etc., may last for many hours or even days.

PS core networks, such as the Evolved Packet Core (EPC), allow end users to engage in data sessions that are "always on". "Always-on" sessions may be active over the PS core network for several hours or several days. Although the session is active, there may be idle periods where the end user's device is not sending or receiving data. For example, if an end user is logged into an online game, a session will be active while the end user is logged in. But, the end user may not play the game continuously when logged in, so consequently there will be idle periods during the gaming session where the end user device is not actually consuming data.

End users that are served by a PS core network may subscribe to offline charging. Offline charging refers to a charging method where charging information for network resource usage is collected concurrently with the resource usage. When network elements in the PS core network provide services for a session, the network elements are configured to report charging events to an Offline Charging System (OFCS) when certain trigger conditions are met. Some examples of triggers for charging events are data volume limits and time limits. For a data volume limit, a charging event is triggered if the volume of downlink data and/or uplink data for an end user exceeds a maximum. For example, the downlink limit may be 100 MB, and the uplink limit may be 10 MB. For the time limit, a charging event is triggered if a time limit has expired since the last charging event. For example, the time limit may be 15 minutes. Other types of trigger conditions may be specified, such as described in 3GPP TS 32.251.

When trigger conditions are detected, the network element reports the charging event to the OFCS in the form an accounting request, such as a Diameter Rf Accounting Request (ACR). The OFCS then generates Charging Data Records (CDR) for the each of the network elements based on the accounting requests that are received. At some point in time, the OFCS passes the CDRs to the billing domain where a bill is generated at the end of a billing cycle (e.g., a monthly billing cycle). The network operator can then send out a bill to the end user that specifies the usage by the end user during the billing cycle.

Unfortunately, sessions that are "always on" can cause problems to network operators when charging for these sessions.

SUMMARY

Embodiments described herein control whether network elements are allowed to report charging events to an OFCS upon detection of a time limit trigger. Traditionally, a network element would report a charging event to the OFCS when the time limit trigger expires. This works effectively when an end user is actively consuming data in the downlink or uplink direction, because the network element would be reporting actual use of data (i.e., data consumption) to the OFCS. However, sessions may have periods of idle time where the end user is not actively consuming data. Even during these idle periods, a traditional network element will periodically report charging events to the OFCS based on the time limit trigger (e.g., every fifteen (15) minutes, as predicated by the value of the Accounting Interim Interval set for the deployment) even though there is no change in data or "insignificant" data usage to report. For instance, a network element may send multiple interim accounting requests to the OFCS that show zero (0) bytes of consumption in the downlink and uplink directions. Unfortunately, the reporting zero or very low data usage by network elements to an OFCS wastes network resources.

In the embodiments described herein, before a network element reports a charging event to an OFCS based on a time limit trigger, the network element identifies the amount of data consumed during the time limit. If the data consumed is insignificant, such as zero (0) bytes, a few kB, or below a threshold amount of bytes, then the network element ignores the time limit trigger and does not report a charging event to the OFCS. If the data consumed is more than an insignificant amount (i.e., at or above a threshold amount of bytes), such as 1 MB, then the network element processes the time limit trigger and reports a charging event to the OFCS. The threshold amount of data considered "insignificant" is configurable by the network operator. The network element is therefore able to intelligently report charging events to the OFCS when there is data usage that is worth reporting to the OFCS, which saves network resources.

One embodiment comprises a network element of a communication network that serves an active session for User Equipment (UE). The network element includes a Charging Trigger Function (CTF) configured to detect expiry of a time limit for triggering an interim accounting request to an offline charging system during the active session, to identify a data usage by the UE during the time limit, and to determine if the data usage by the UE during the time limit exceeds a threshold. If the data usage exceeds the threshold, then the CTF is configured to send the interim accounting request to the offline charging system responsive to expiry of the time limit. If the data usage does not exceed the threshold, then the CTF is configured to stop the interim accounting request from being sent to the offline charging system responsive to expiry of the time limit.

In another embodiment, the threshold is less than a data volume limit for triggering other interim accounting requests to the offline charging system.

In another embodiment, the threshold includes a downlink threshold and an uplink threshold.

In another embodiment, the interim accounting request comprise a Diameter Rf Accounting Request (ACR)[Interim].

In another embodiment, the communication network includes an Evolved Packet Core (EPC), and the network element comprises one of a Serving Gateway (S-GW) and a Packet Data Network Gateway (PDN-GW).

Another embodiment comprises a method operable in a network element of a communication network that serves an active session for User Equipment (UE). The method includes the steps of detecting expiry of a time limit for triggering an interim accounting request to an offline charging system during the active session, identifying a data usage by the UE during the time limit, and determining if the data usage by the UE during the time limit exceeds a threshold. If the data usage exceeds the threshold, then the method includes sending the interim accounting request from the network element to the offline charging system responsive to expiry of the time limit. If the data usage does not exceed the threshold, then the method includes stopping the interim accounting request from being sent to the offline charging system responsive to expiry of the time limit.

Another embodiment comprises a non-transitory computer-readable medium that stores program instructions for providing offline charging in a network element of a communication network that serves an active session for User Equipment (UE). The program instructions, when executed by a computer system, cause the computer system to detect expiry of a time limit for triggering an interim accounting request to an offline charging system during the active session, identify a data usage by the UE during the time limit, and determine if the data usage by the UE during the time limit exceeds a threshold. If the data usage exceeds the threshold, then the computer system sends the interim accounting request to the offline charging system responsive to expiry of the time limit. If the data usage does not exceed the threshold, then the computer system stops the interim accounting request from being sent to the offline charging system responsive to expiry of the time limit.

Other exemplary embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
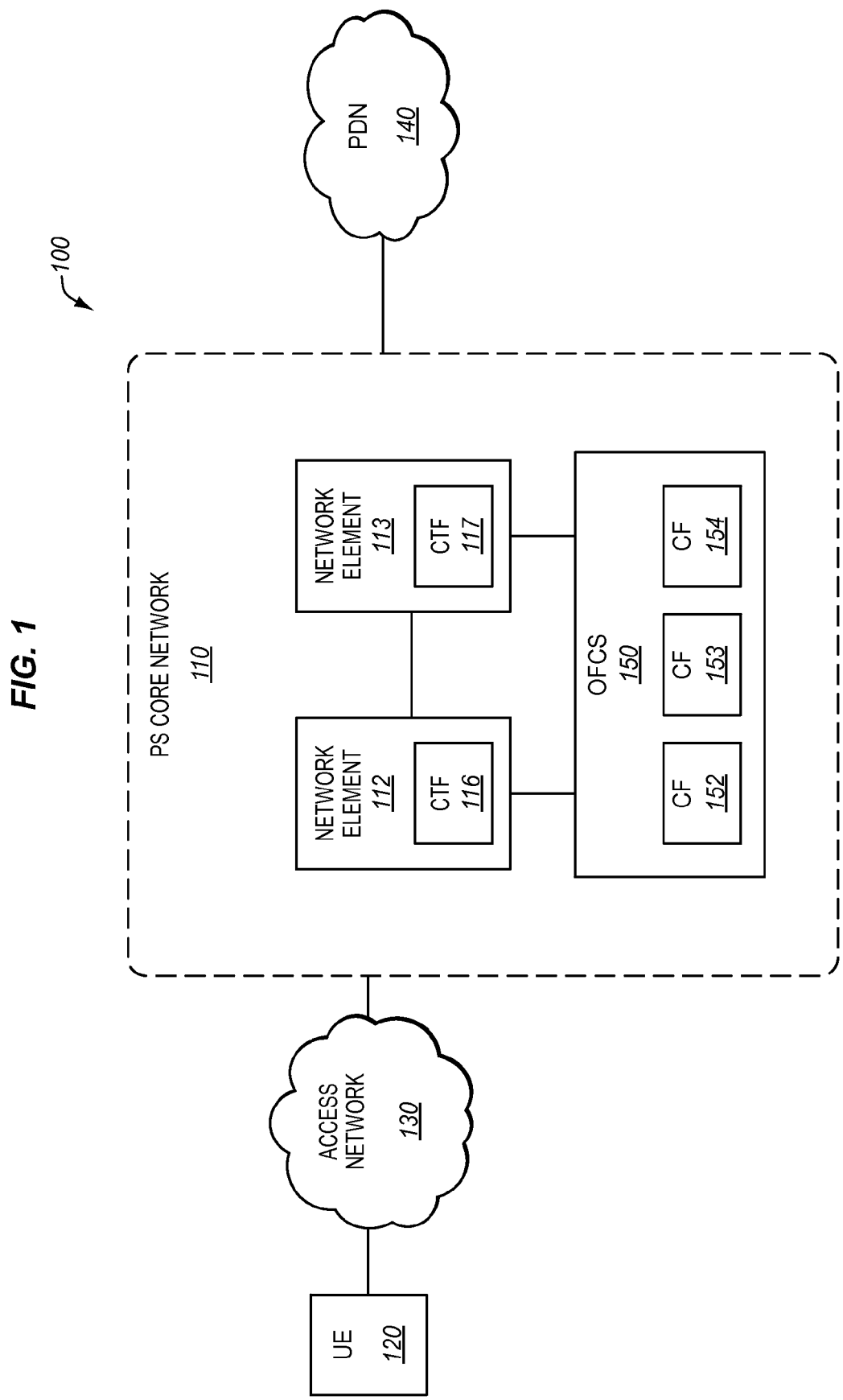
FIG. 1 illustrates a communication network in an exemplary embodiment.

FIG. 1 illustrates a communication network 100 in an exemplary embodiment. Communication network 100 may represent a Long Term Evolution (LTE) network, an IP Multimedia Subsystem (IMS) network, or another type of Third Generation (3G) or Fourth Generation (4G) communication network. Network 100 includes a Packet-Switched (PS) core network 110 that provides various services to end users. One example of PS core network 110 is an Evolved Packet Core (EPC) network. In this embodiment, PS core network 110 includes network elements 112-113 that are each able to provide services. One example of network element 112 may be a Serving Gateway (S-GW) of an EPC network as described in the LTE standards. One example of network element 113 may be a Packet Data Network Gateway (PDN-GW) of an EPC network as described in the LTE standards. Other examples of network elements 112-113 may be a Mobility Management Entity (MME), an Application Server (AS), etc. PS core network 110 may include many more network elements that are not shown in FIG. 1 for ease of illustration.

PS core network 110 provides data services to User Equipment (UE) 120 (and other UEs not shown). UE 120 may be a mobile device (e.g., a mobile phone), a computer, a tablet, etc. UE 120 is able to access PS core network 110 through access network 130. Access network 130 comprises any type of network that interfaces UEs with PS core network 110. One example of access network 130 is a Radio Access Network (RAN), such as a UMTS Terrestrial Radio Access Network (UTRAN), an enhanced UTRAN (E-UTRAN), an Interworking-Wireless Local Area Network (I-WLAN), etc. PS core network 110 also connects to one or more external Packet Data Networks (PDN) 140, such as the internet.

Within PS core network 110, network elements 112-113 each include a Charging Trigger Function (CTF) 116-117, respectively. A CTF comprises any entity that generates charging events based on the observation of network resource usage. The CTF is the focal point for collecting information pertaining to chargeable events within a network element, assembling this information into matching charging events, and sending these charging events towards a charging function in the form of accounting requests. A CTF is implemented in each network element or service element that provides charging information. Therefore, CTF 116 is illustrated in FIG. 1 as being embedded in network element 112, and CTF 117 is illustrated in FIG. 1 as being embedded in network element 113.

PS core network 110 also includes an Offline Charging System (OFCS) 150. OFCS 150 comprises any system, server, or function operable to provide offline charging for services/sessions accessed by end users, such as UE 120. OFCS 150 includes a group of peer charging functions 152-154 used for offline charging. A charging function 152-154 is configured to receive accounting requests (i.e., charging events) from network elements, and use the charging information contained in the accounting requests to construct Charging Data Records (CDRs). One example of a charging function 152-154 is a Charging Data Function (CDF) as defined by the 3GPP in TS 32.240 (Release 6). The purpose of offline charging is to transform the charging information into CDRs that are post-processed within a Billing Domain (BD) for the purpose of generating bills.

Offline charging can be categorized into two distinct classes: event-based charging and session-based charging. In event-based charging, a chargeable event is defined as a single end-user-to-network transaction, such as sending a multimedia message. The single transaction is mapped to a charging event, which results in a single CDR. In session-based charging, a user session is established resulting in the generation of multiple chargeable/charging events and the generation of one or more CDRs. In session-based charging, at least two charging events are needed for each session. One charging event describes the start of the session, and the other charging event describes the end of the session. Multiple other charging events, so called interim charging events, may also be utilized to describe changes to session characteristics (i.e., change of charging conditions), when a time limit is reached, when a volume limit is reached, etc.

The CTFs 116-117 described herein store charging characteristics for offline charging. The charging characteristics may be provided by a database, such as a Home Subscriber Server (HSS), or may be default characteristics. The charging characteristics define triggers for reporting charging events to OFCS 150. One of the triggers that may be stored by a CTF is a time limit between charging events. The CTF maintains a counter of the time since it last reported an accounting request to OFCS 150, and is configured to trigger or report an interim accounting request to OFCS 150 upon expiry of the time limit. Another one of the triggers that may be stored by a CTF is a data volume limit. The CTF maintains a counter of the amount of data consumed (downlink and/or uplink) for an end user during a session, and is configured to trigger an interim accounting request to OFCS 150 if the volume of data consumed exceeds the data volume limit. The charging characteristics may include other triggers for charging events that are not discussed herein.

According to the embodiments described herein, CTFs 116-117 are configured to control whether or not interim accounting requests are triggered to OFCS 150 due to expiry of the time limit based also on a data threshold defined in the charging characteristics. Instead of automatically reporting an interim accounting request to OFCS 150 when the time limit expires, CTFs 116-117 determine whether data usage during the time limit exceeds a threshold. CTFs 116-117 store a data threshold that is associated with the time limit trigger. The data threshold indicates a minimum amount of data that has to have been consumed upon expiry of the time limit (i.e., minimum amount of data consumed within the duration of the time limit) before an interim accounting request is triggered toward OFCS 150. The data threshold may be set at a number between zero (0) bytes and a chosen amount of data. The data threshold may be limited to a maximum of the amount of data defined for the data volume limit. For example, a data volume limit may indicate a downlink limit of 100 MB and an uplink limit of 10 MB for triggering an interim accounting request. The data threshold defined for the time limit trigger may set to be a percentage of the downlink and uplink limits, such as 100 kB downlink and 10 kB uplink, or may be set to given values, such as 50 kB downlink and 5 kB uplink. The data threshold (s) defined for the time limit trigger may be configurable by the network operator.

In FIG. 1, assume that UE 120 registers with network 100 in order to receive services, and requests a data session. A session as described herein may be referred to as an IP Connectivity Access Network (IP-CAN) session. An IP-CAN session is an association between UE 120 represented by an IPv4 address and/or an IPv6 prefix, and PDN 140. An IP-CAN session may incorporate one or more IP-CAN bearers. An IP-CAN bearer is an IP transmission path of defined capacity, delay and bit error rate, etc. Each IP-CAN bearer may be made up of one or more Service Data Flows (SDF), which is a flow of packets.

If a session initiates and network element 112 activates a bearer for the session (e.g., an IP-CAN bearer), then CTF 116 of network element 112 identifies an initial chargeable event responsive to the start of the session. The start of a "session" may refer to the start of an IP-CAN bearer, the start of a service data flow for an IP-CAN bearer, the start of an IP Multimedia Subsystem (IMS) session, etc. CTF 116 generates an initial accounting request for the session responsive to the initial chargeable event, and transmits the initial accounting request to OFCS 150 to initiate session-based offline charging for the session. The initial accounting request generated by CTF 116 may comprise a Diameter Rf ACR[Start]. In response to the initial accounting request, OFCS 150 will open a Charging Data Record (CDR) for network element 112.

Figure 2:
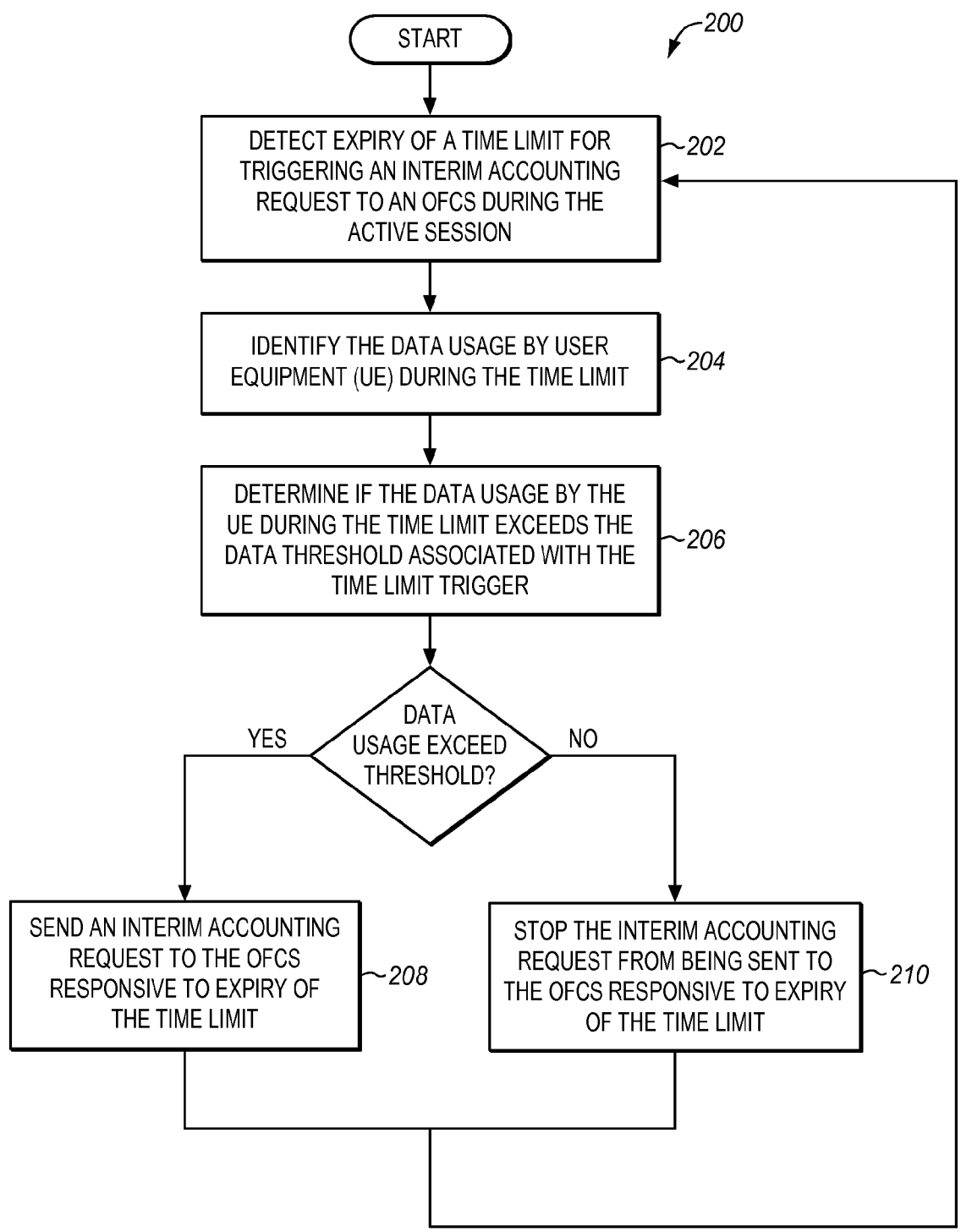
FIG. 2 is a flow chart illustrating a method of controlling transmission of interim accounting requests to an Offline Charging System (OFCS) in an exemplary embodiment.

As network element 112 continues to serve the session, CTF 116 may encounter other trigger conditions for reporting interim charging events to OFCS 150. FIG. 2 indicates how CTF 116 controls whether interim accounting requests are sent to OFCS 150 when a trigger condition is met.

FIG. 2 is a flow chart illustrating a method 200 of controlling transmission of interim accounting requests to OFCS 150 in an exemplary embodiment. The steps of method 200 will be described with reference to network element 112 in FIG. 1, but those skilled in the art will appreciate that method 200 may be performed in other systems. Also, the steps of the flow chart in FIG. 2 are not all inclusive and may include other steps not shown, and further, the steps may be performed in an alternative order.

In step 202, CTF 116 of network element 112 detects expiry of the time limit for triggering an interim accounting event to OFCS 150 during the active session. In step 204, CTF 116 identifies the data usage by UE 120 during the time limit. As stated above, CTF 116 maintains a volume count of the data consumed during the active session (separated for downlink and uplink). CTF 116 can therefore determine the data usage of UE 120 during the time limit specified in the charging characteristics. CTF 116 then determines if the data usage by UE 120 during the time limit exceeds the data threshold associated with the trigger in step 206.

If the data usage exceeds the data threshold, then CTF 116 sends an interim accounting request to OFCS 150 responsive to expiry of the time limit. The interim accounting request may comprise a Diameter Rf ACR[Interim], a Diameter Ga CDR, etc. The interim accounting request may include details such as a Subscription-ID (e.g., IMSI), a Charging-ID, an address for network element 112, a container identifying the volume count (separated for uplink and downlink traffic) for the (IP-CAN) bearer, etc.

If the data usage does not exceed the threshold, then CTF 116 does not send the interim accounting request to OFCS 150 responsive to expiry of the time limit. Thus, CTF 116 does not report the interim accounting request to OFCS 150 if the data usage of UE 120 does not exceed the data threshold associated with the time limit trigger, even though time related conditions for the trigger have been met. Traditionally, a CTF would report the interim accounting request to OFCS 150 automatically if conditions for a time limit trigger have been met. However, CTF 116 described herein intelligently reports an interim accounting request to OFCS 150 if the data usage of UE 120 exceeds the data threshold upon expiry of a time limit. It is understood that CTF 116 establishes an agreement with OFCS 150 a priori so that the OFCS 150 does not time out the session upon non-receipt of the periodic interim accounting requests.

The provided methodology and trigger advantageously saves network resources, because some conventional interim accounting requests would report that no data usage or only an insignificant amount of data usage, such as during an idle period of the session. It is essentially a waste of resources to report "empty" interim accounting requests to an OFCS. By defining the data threshold as described herein, a CTF sends interim accounting requests to OFCS 150 that report more than an insignificant amount of data usage (i.e., data usage that exceeds the data threshold), so that it is worthwhile to use network resources to report the interim accounting requests.

Example

Figure 3:
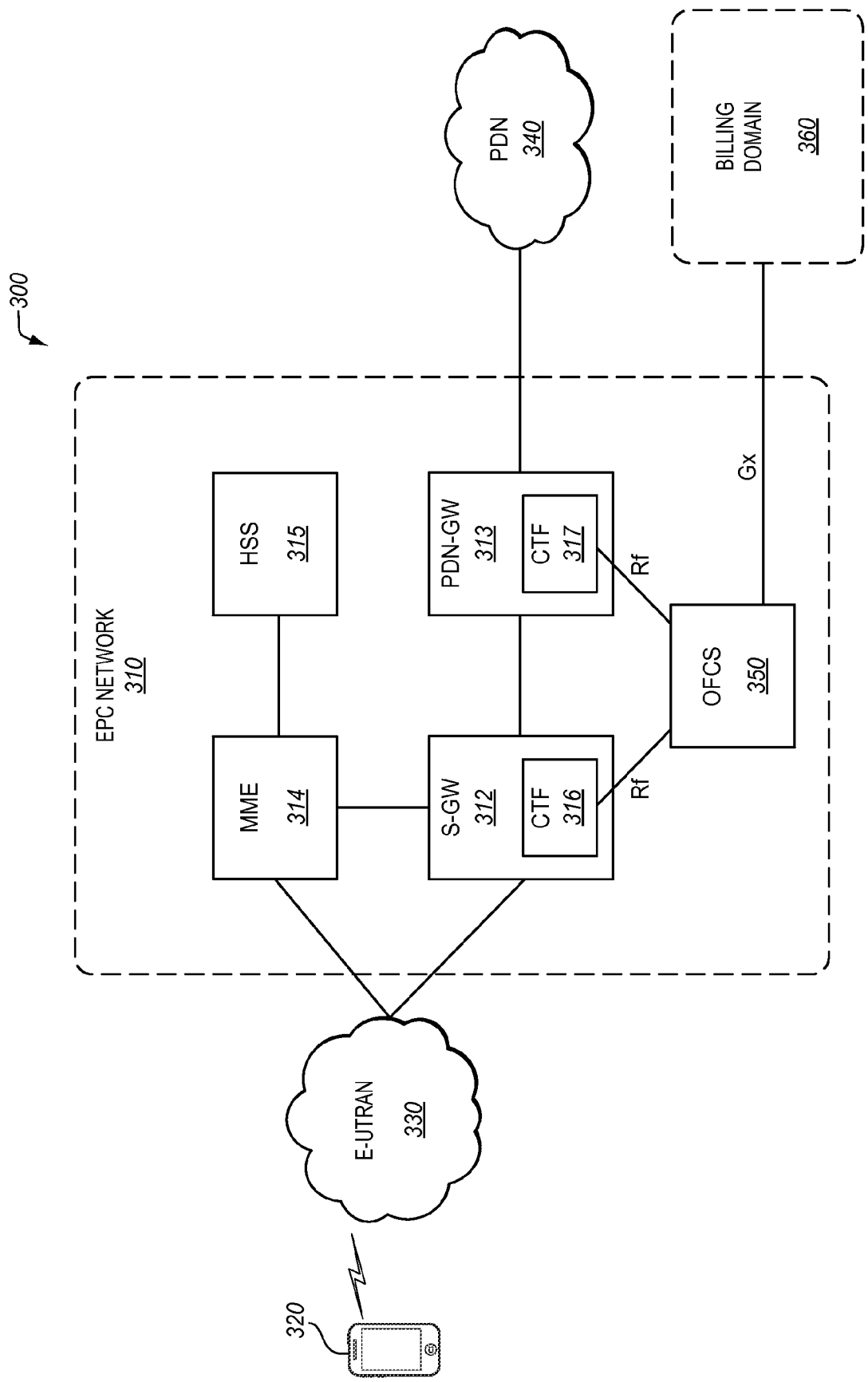
FIG. 3 illustrates a Long Term Evolution (LTE) network in an exemplary embodiment.

FIG. 3 illustrates a Long Term Evolution (LTE) network 300 in an exemplary embodiment. LTE network 300 includes an Evolved Packet Core (EPC) network 310 in which a UE 320 is subscribed to a service plan. EPC network 310 includes a Serving Gateway (S-GW) 312, a PDN Gateway (PDN-GW) 313, a Mobility Management Entity (MME) 314, and a Home Subscriber Server (HSS) 315. The illustrated network elements of an EPC network are shown as an example, and EPC network may include other network elements not shown.

S-GW 312 is the gateway that terminates the interface from EPC network 310 towards E-UTRAN 330. S-GW 312 is responsible for transferring the data packets for a session across the user plane. PDN-GW 313 is the gateway that terminates the interface from EPC network 310 to an external Packet Data Network (PDN) 340. PDN-GW 313 is responsible for connectivity between UE 320 and PDN 340 by being the entry/exit point of traffic. MME 314 is responsible for tracking the location of UE 320, and paging UE 320 for communications. HSS 315 is a central database that stores subscription information for end users. For example, HSS 315 may store subscriber profiles that indicate which services an end user subscribes to in EPC network 310.

The following example illustrates an offline charging system within LTE network 300. To implement offline charging, a Charging Trigger Function (CTF) 316 is imbedded in S-GW 312, and a CTF 317 is embedded in PDN-GW 313. LTE network 300 also includes offline charging system (OFCS) 350. CTFs 316-317 are connected to OFCS 350 over a Diameter Rf reference point. OFCS 350 is also connected to the billing domain 360 over a Diameter Gx reference point.

Figure 4:
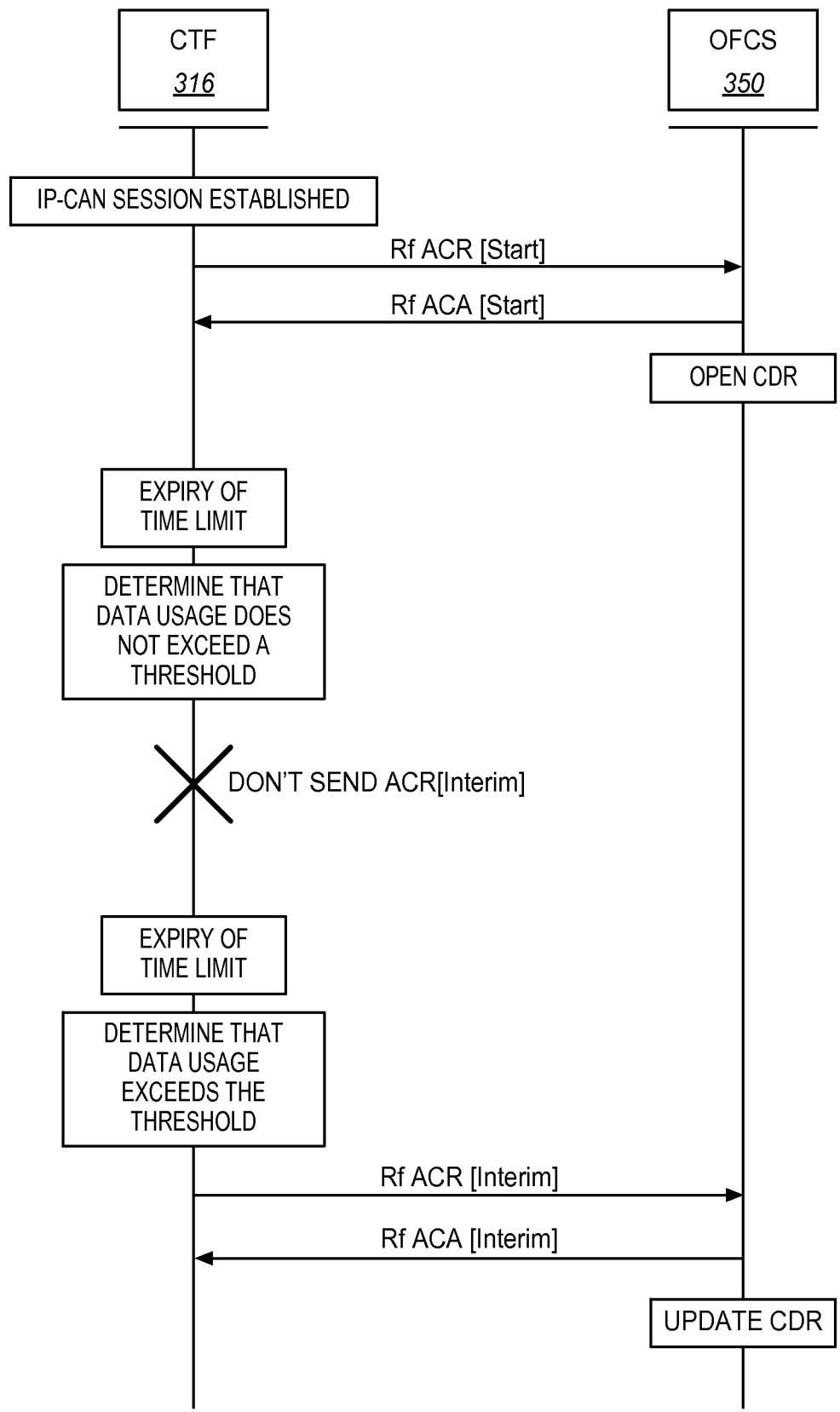
FIG. 4 is a message diagram illustrating an example of controlling whether interim charging events are reported to an OFCS in an exemplary embodiment.

FIG. 4 is a message diagram illustrating an example of controlling whether interim charging events are reported to OFCS 350 in an exemplary embodiment. In this example, assume that an IP-CAN bearer is activated for an IP-CAN session involving UE 320. S-GW 312 is involved in activating the IP-CAN session. CTF 316 within S-GW 312 identifies a chargeable event when the IP-CAN session begins. Thus, CTF 316 generates a Diameter Rf ACR[Start], and sends the ACR [Start] to OFCS 350. In response to the ACR[Start], OFCS 350 opens a CDR for the IP-CAN bearer for S-GW 312, and replies back to CTF 316 with a Diameter Rf Accounting Answer, e.g., ACA[Start].

Between the time the IP-CAN bearer is activated and the time when the IP-CAN bearer is torn down, CTF 316 may encounter triggering conditions for reporting interim charging events to OFCS 350. One of the triggers in the charging characteristics for reporting interim charging events to OFCS 350 is a time limit. Therefore, CTF 316 will maintain a counter based on the last time instance when an ACR[Start] or ACR[Interim] was sent to OFCS 350. When CTF 316 detects expiry of the time limit defined in the charging characteristics, CTF 316 does not automatically send a Diameter Rf ACR [Interim] to OFCS 350. Instead, CTF 316 identifies the data usage by UE 320 during the time limit by monitoring a volume counter for the IP-CAN bearer. CTF 316 then determines if the data usage by UE 320 exceeds a threshold during the time limit. The threshold may be some configurable percentage of the data volume limit specified in the charging characteristics (e.g., data volume limit>threshold≥0) or a given amount of data which may be configurable. If the data usage during the time limit exceeds the threshold, then CTF 316 sends a Diameter Rf ACR[Interim] to OFCS 350 responsive to expiry of the time limit. If the data usage does not exceed the threshold during the time limit, then CTF 316 does not send a Diameter Rf ACR[Interim] to OFCS 350 responsive to expiry of the time limit.

The assumption at this point is that the data usage of UE 320 does not exceed the threshold (e.g., there is an idle period during the active session). Because the data usage was below the threshold, CTF 316 does not report a Diameter Rf ACR [Interim] to OFCS 350 even though the time limit conditions for the trigger have been met. When CTF 316 does not send a Diameter Rf ACR[Interim] to OFCS 350 upon expiry of the time limit, CTF 316 also does not increment the sequence number stored for the ACRs. CTF 316 will not increment the sequence number until another ACR[Interim] is actually sent to OFCS 350.

CTF 316 then continues to monitor the triggers defined in the charging characteristics while S-GW 312 serves the IP-CAN session. If CTF 316 again detects that the time limit has expired for sending an ACR[Interim], then CTF 316 identifies the data usage by UE 320 during this time limit. CTF 316 then determines if the data usage by UE 320 exceeds the threshold during the time limit. If the data usage during the time limit exceeds the threshold, then CTF 316 sends a Diameter Rf ACR[Interim] to OFCS 350 responsive to expiry of the time limit. If the data usage does not exceed the threshold during the time limit, then CTF 316 does not send a Diameter Rf ACR[Interim] to OFCS 350 responsive to expiry of the time limit.

The assumption at this point is that the data usage of UE 320 exceeds the threshold (e.g., there is consumption of data of a "significant" amount during the IP-CAN session). Because the data usage was above the threshold, CTF 316 sends a Diameter Rf ACR[Interim] to OFCS 350. OFCS 350 will then update the CDR for the session based on charging information included in the ACR[Interim].

CTF 316 will continue to monitor the session for chargeable events that trigger an ACR[Interim]. If conditions for the time limit trigger are met again, then CTF 316 will operate as described above to determine whether or not to send an ACR [Interim] to OFCS 350.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
a network element for a communication network for serving an active session for User Equipment (UE);
the network element includes a Charging Trigger Function (CTF) configured to detect expiry of a time limit for triggering an interim accounting request to an offline charging system during the active session, to identify a data usage by the UE during the time limit, and to determine if the data usage by the UE during the time limit exceeds a threshold;
the CTF is configured to send the interim accounting request to the offline charging system responsive to expiry of the time limit if the data usage exceeds the threshold; and
the CTF is configured to stop the interim accounting request from being sent to the offline charging system responsive to expiry of the time limit if the data usage does not exceed the threshold.

2. The apparatus of claim 1 wherein:
the threshold is less than a data volume limit for triggering other interim accounting requests to the offline charging system.

3. The apparatus of claim 1 wherein:
the threshold includes a downlink threshold and an uplink threshold.

4. The apparatus of claim 1 wherein:
the interim accounting request comprise a Diameter Rf Accounting Request (ACR)[Interim].

5. The apparatus of claim 1 wherein:
the communication network includes an Evolved Packet Core (EPC).

6. The apparatus of claim 5 wherein:
the network element comprises a Serving Gateway (S-GW) of the EPC.

7. The apparatus of claim 5 wherein:
the network element comprises a Packet Data Network Gateway (PDN-GW) of the EPC.

8. A method operable in a network element of a communication network that serves an active session for User Equipment (UE), the method comprising:
detecting expiry of a time limit for triggering an interim accounting request to an offline charging system during the active session;
identifying a data usage by the UE during the time limit;
determining if the data usage by the UE during the time limit exceeds a threshold;
sending the interim accounting request from the network element to the offline charging system responsive to expiry of the time limit if the data usage exceeds the threshold; and
preventing the interim accounting request from being sent to the offline charging system responsive to expiry of the time limit if the data usage does not exceed the threshold.

9. The method of claim 8 wherein:
the threshold is less than a data volume limit for triggering other interim accounting requests to the offline charging system.

10. The method of claim 8 wherein:
the threshold includes a downlink threshold and an uplink threshold.

11. The method of claim 8 wherein:
the interim accounting request comprise a Diameter Rf Accounting Request (ACR)[Interim].

12. The method of claim 8 wherein:
the communication network includes an Evolved Packet Core (EPC).

13. The method of claim 12 wherein:
the network element comprises a Serving Gateway (S-GW) of the EPC.

14. The method of claim 12 wherein:
the network element comprises a Packet Data Network Gateway (PDN-GW) of the EPC.

15. A non-transitory computer-readable medium that stores program instructions for providing offline charging in a network element of a communication network that serves an active session for User Equipment (UE), the program instructions, when executed by a computer system, cause the computer system to:
detect expiry of a time limit for triggering an interim accounting request to an offline charging system during the active session;
identify a data usage by the UE during the time limit;
determine if the data usage by the UE during the time limit exceeds a threshold;
send the interim accounting request to the offline charging system responsive to expiry of the time limit if the data usage exceeds the threshold; and
stop the interim accounting request from being sent to the offline charging system responsive to expiry of the time limit if the data usage does not exceed the threshold.

16. The computer-readable medium of claim 15 wherein:
the threshold is less than a data volume limit for triggering other interim accounting requests to the offline charging system.

17. The computer-readable medium of claim 15 wherein:
the threshold includes a downlink threshold and an uplink threshold.

18. The computer-readable medium of claim 15 wherein:
the interim accounting request comprise a Diameter Rf Accounting Request (ACR)[Interim].

19. The computer-readable medium of claim 15 wherein:
the network element comprises a Serving Gateway (S-GW) of an Evolved Packet Core (EPC).

20. The computer-readable medium of claim 15 wherein:
the network element comprises a Packet Data Network Gateway (PDN-GW) of an Evolved Packet Core (EPC).

* * * * *